Oct. 28, 1941.  W. T. HANCOCK  2,260,618
PROCESS OF REFINING PETROLEUM HYDROCARBONS
Filed Nov. 27, 1939
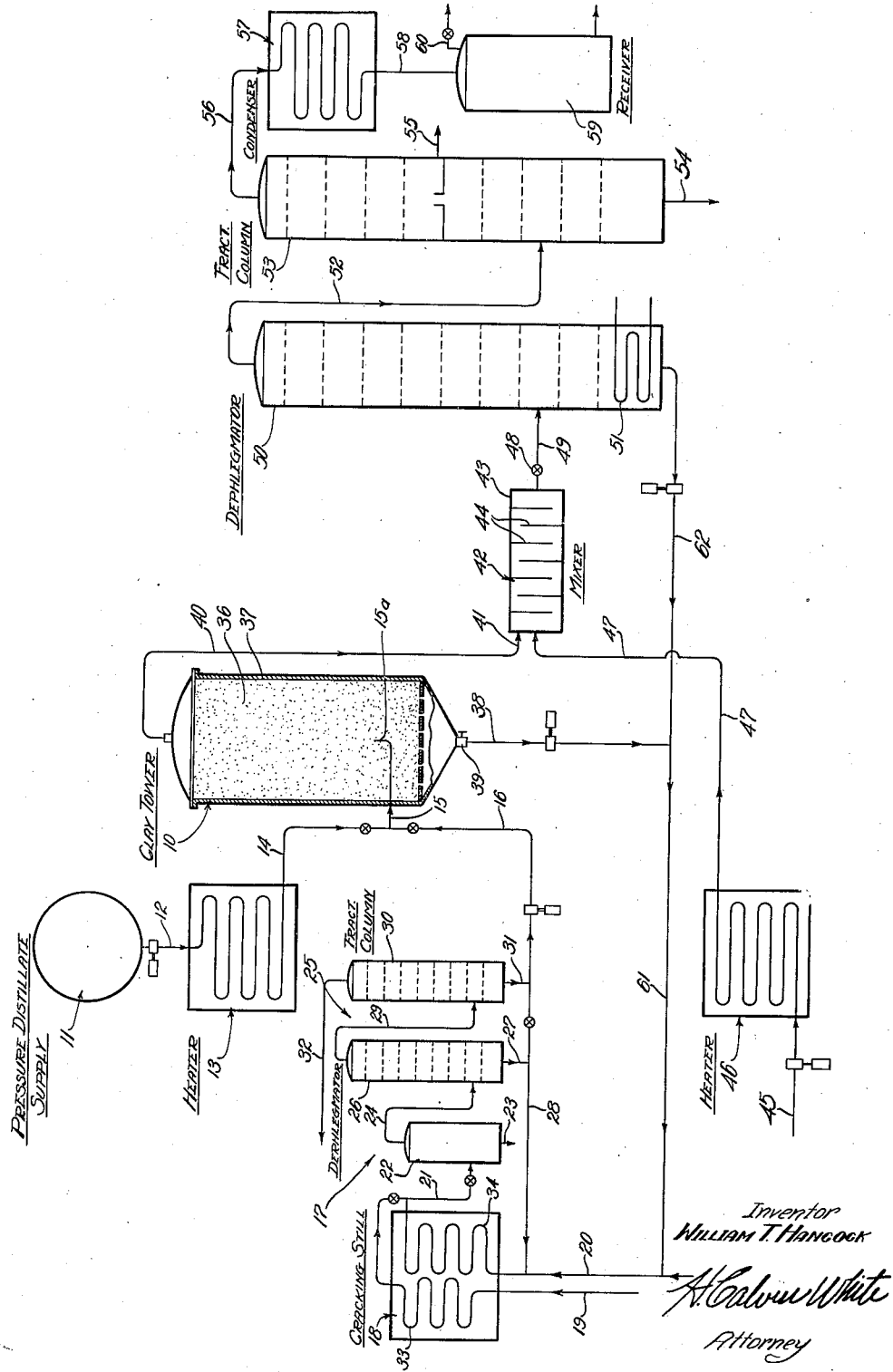
Inventor
WILLIAM T. HANCOCK
H. Calvin White
Attorney Patented Oct. 28, 1941

2,260,618

UNITED STATES PATENT OFFICE 2,260,618

PROCESS OF REFINING PETROLEUM HYDROCARBONS

William T. Hancock, Long Beach, Calif.

Application November 27, 1939, Serial No. 306,347

12 Claims. (Cl. 196—147)

This invention has to do generally with the refining of petroleum hydrocarbons, and is concerned particularly with an improved system for treating cracked pressure distillate for the purpose of removing polymers and gum forming impurities, and further if desired, to materially increase the yield of gasoline or other relatively valuable fractions, by additional conversion and treatment of polymerized constituents.

In one of its general aspects, the invention has for its object to provide an improved method for subjecting hydrocarbons to polymerization by treatment with adsorptive material, such as one or a mixture of known adsorptive clays, and referred to hereinafter typically as a clay. The present system is particularly directed to the polymerization of unsaturated hydrocarbons in liquid or mixed liquid and vapor phase, and in this aspect improves upon past methods in one respect, among others, that the effective life of the adsorbent material is considerably prolonged by the manner in which the polymers are removed from the clay and prevented from contaminating the clay under such conditions as ordinarily occur by flowing the distillate and contained polymers together through the clay. Briefly stated the present method avoids the usual degree of polymer contamination of the clay, by providing for gravity separation and settling out of the heavier polymerized compounds from the location of their formation in the clay, all in a manner such that the polymers are not required to pass through other portions of the clay body beyond such locations.

The present system also embodies various improvements in the general type of treating system disclosed in Patent Number 2,162,715, issued June 20, 1939, to me on Process for refining cracked petroleum distillate. According to that system, heated gasoline-containing pressure distillate is subjected to polymerization by passage through a body of adsorptive material, and then is admixed with heated heavier or solvent oil from which gasoline and other fractions are recovered by vaporization, leaving gum-forming constituents of the distillate being treated, remaining in the heavy solvent oil. In accordance with the present invention, gum forming constituents of the pressure distillate that become polymerized by treatment with clay, are removed from the distillate stream prior to mixing it with the heavier oil, thus preventing overloading of the latter and increasing the degree and efficiency of polymer extraction from the distillate.

As previously indicated, the invention also contemplates utilizing the polymerized hydrocarbons by subjecting them to reconversion and treatment to produce gasoline and other valuable fractions. For this purpose, the polymers, or separated distillate stream containing the polymers, may be subjected to cracking and the resultant cracked hydrocarbons further treated to produce recoverable gasoline. In the cracking operation, organically combined sulphur in the polymers is converted largely to fixed sulphur gases, e. g. sulphur dioxide and hydrogen sulphide, and thus to a form in which the sulphur may easily be removed from the system. After undergoing cracking, the polymer derived hydrocarbons may be returned to the clay tower for treatment together with the pressure distillate flowing therethrough.

The invention includes various additional objects and details, but these as well as the features generally discussed in the foregoing will be explained to better advantage by describing the system illustrated in the accompanying drawing and representing a typical system embodying the invention, shown diagrammatically and in flow sheet form.

Referring to the drawing, suitable means shown typically as a clay containing column or tower generally indicated at 10, is provided for subjecting gasoline-containing heated pressure distillate to polymerization under conditions later described more in detail. It is to be understood that in the broad aspects of the invention, the pressure distillate fed to the clay column 10 may be derived from any suitable source, and that it may have any desired boiling range. As illustrative, I may feed to the clay tower pressure distillate having a boiling range from 90° F. to 425° F., heated to a suitable temperature at which proper polymerization will occur in the tower, which temperature usually will be in excess of 200° F. and preferably in the neighborhood of 350° F. to 375° F., or above.

As illustrated, the pressure distillate may be taken from a source of supply, such as the storage tank 11, through line 12 to a heater 13 wherein the oil is heated to proper polymerizing temperature and from which the heated oil passes through lines 14 and 15 into the clay tower 10. As an alternative, heated pressure distillate may be supplied to the clay tower through line 16 direct from a suitable cracking plant generally indicated at 17. This cracking plant may be one of any known type and construction for producing pressure distillate, and is shown typically and conventionally to comprise a tube still 18 to which charging stock such as fuel oil or gas oil is supplied through either or both of lines 19 and 20. The cracked oil stream leaving the still 18 through line 21 enters a reaction chamber 22 from which unvaporized residue is withdrawn through line 23 and removed from the system. The cracked vapors flow from the reaction chamber 22 through line 24 to suitable fractionating apparatus, denoted generally at 25, by means of which the cracked pressure distillate is produced. This fractionating apparatus 25 is shown typically to comprise a dephlegmator or fractionating column 26 from the base of which relatively high boiling hydrocarbons within the fuel oil range, or above, are withdrawn through line 27 and recirculated through line 28 to the cracking still. The overhead vapors are discharged through line 29 into fractionating column 30 from the base of which the pressure distillate is discharged through lines 31 and 16 to the clay tower 10. Fixed and uncondensible gases leaving column 30 through line 32 may be further treated or disposed of as desired. The charging stock may be fed to coil 33 in the cracking still 18 through line 19 and the reflux condensate returned through line 28 and subjected to cracking in an independent coil 34; or the cracking still charging stock may be supplied through line 20 so that the charging stock and reflux condensate will be combined and subjected to cracking in the same coil 34.

The clay tower 10 is charged with a body 36 of suitable adsorptive material, preferably adsorptive clay such as fuller's earth, Muroc and Death Valley clay, which may be treated with acid or other electrolyte to increase its normal effectiveness as a polymerizing medium, all in a manner familiar to those skilled in the art. The heated pressure distillate is introduced to the clay body 36 through line 15, the outlet 15a of which preferably is positioned at an intermediate depth in the clay bed and directed so that the distillate is caused to flow upwardly within the clay. When subjected to the action of the clay, the distillate undergoes polymerization, with the resultant formation of relatively heavy or high boiling polymers which, as is known, are dark colored, gum-forming compounds desirably removable as impurities from the distillate and final gasoline product. The diameter of shell 37 is made sufficiently large, relative to the distillate throughput, that the rate of upward flow of the distillate will be sufficiently slow to permit gravity-settling of the heavy polymers to the bottom of the clay body and into the drain discharge line 38. The rate of discharge of polymers or polymer containing distillate through line 38 may be regulated by a suitable valve control, conventionally illustrated at 39, whereby the rate of draw-off from the clay tower may be governed in accordance with the quantity and rate of polymer formation. By thus providing for settling and drainage of polymers from the body of clay, the effective life of the clay is materially prolonged, since the polymers, or at least all of the polymerized bodies, are prevented from being carried by the distillate through the entire body of clay. Instead, as the polymers are formed, they tend to settle and gravitate to the bottom of the tower, without passing through the portion of the clay body above the location of their formation.

For the purpose of further treatment, the relatively polymer-free distillate may be discharged from the clay tower 10 through line 40 and introduced at 41 into a suitable mixing chamber 42, shown to comprise a shell 43 provided with mixing baffles 44, to be intimately admixed with a heated heavier oil. This heavier oil may be of any suitable type and composition containing at least a substantial portion of hydrocarbon fractions of higher boiling range than the gasoline contained in the pressure distillate removed from the clay tower through line 40. Typically, the heavier oil may consist of a crude oil, with or without considerable gasoline fractions, or an untreated fuel oil or gas oil, or combination of both. The heavier oil, taken from a suitable supply source through line 45, is pumped through a heater 46 wherein the oil is pre-heated to a temperature preferably in excess of the temperature of the pressure distillate being introduced to mixer 42, and preferably to a temperature ranging from 500° F. to 600° F.

The pre-heated heavier oil is discharged through line 47 to be combined or admixed in the mixing chamber 42 with the clay treated pressure distillate, ordinarily in the proportion of from two to four parts of the heavier oil to one part of the pressure distillate. Valve 48 in the mixer discharge line 49 is set to maintain sufficient back pressure that at least a major portion of the oils being mixed, and preferably a major portion of the gasoline content thereof, will remain in liquid phase during the mixing.

The admixed oils are discharged through line 49 to a dephlegmator or fractionating column 50 wherein the lighter fractions, say through the gas oil range, of the mixed oils are suitably separated or vaporized, as by flash vaporization due to pressure reduction at the valve 48, the dephlegmator preferably being maintained under comparatively low pressure, for example under 25 lbs. per sq. in. gauge. A steam coil 51 in the base of the dephlegmator, may be used to further deplete the unvaporized residue in the bottom of the dephlegmator, of any light fractions remaining in the residue. As explained more fully and in detail in my issued patent referred to above, admixing the polymerized pressure distillate taken from the clay tower through line 40, with the heated oil flowing from line 47, causes the heavier oil to serve as a solvent or retaining medium for any heavier gum-forming and sulphur containing compounds carried out from the clay tower in the distillate stream. After flash vaporization of the admixture in dephlegmator 50, such gum-forming and sulphur compounds are retained within the unvaporized oil and withdrawn for recirculation to the cracking still through line 62.

The vapors flow from the dephlegmator 50 through line 52 into fractionating column 53, which may be regarded as typical of any suitable apparatus for subjecting the vapors to final fractionation and condensation. A relatively heavy fraction, such as gas oil, may be removed from the base of column 53 through line 54, a next lighter fraction containing kerosene distillate may be removed from the upper section of the column through line 55, and the vapors passed through 56 to a condenser 57 from which the product gasoline flows through line 58 to a receiver 59, fixed gases being taken off through line 60.

In addition to the feature of prolonging the useful life of the clay by removal of polymers in the manner described, the invention contemplates further economy and advantage in providing for recirculation and cracking of the polymers withdrawn from the clay tower to convert the polymers into gasoline or other useable fractions. Thus as illustrated, the polymer containing stream withdrawn from the clay tower 10 may be returned through line 61 to the cracking still 18, and recirculated through coil 34 together with charging stock supplied through line 20, or independently circulated through coil 34 in instances where the charging stock is independently cracked in coil 33. The polymer stream in line 38 also may, if desired, be combined for recirculation to the cracking still with unvaporized oil or residue withdrawn from the base of dephlegmator 50 through line 62. As will be understood, this residue comprises the higher boiling fractions of the admixed pressure distillate and heavier oil supplied from the heater 46, that remain unvaporized after being introduced through line 49 to the dephlegmator. The feature of subjecting the polymers and sulphur compound containing unvaporized solvent oil to cracking is more specifically dealt with and broadly claimed in my copending application Ser. No. 327,198, filed April 1, 1940, on Oil refining and treating system.

In addition to increasing the potential yield of cracked gasoline from the charging stock, recirculation of polymers from clay tower 10 through lines 38 and 61 to the cracking still has the further advantage of converting organically combined sulphur to gaseous forms which are removable from the system as fixed gases through line 60. For example, polymers containing organically combined sulphur recirculated from the clay tower to the cracking still are dissociated to form recoverable gasoline fractions and fixed gases such as sulphur dioxide and hydrogen sulfide, which pass on through the system in uncondensible form. In a similar manner, polymers and sulphur compounds removed from the pressure distillate-solvent oil mixture introduced into dephlegmator 50, by retention in the unvaporized oil recirculated to the cracking still through line 62, are subjected to conversion into recoverable gasoline fractions and fixed gases in the cracking and subsequent treating stages.

I claim:

1. The process of refining petroleum hydrocarbons that includes subjecting heated gasoline-containing cracked petroleum distillate to polymerization by passing the liquid distillate into a body of adsorptive material wherein polymers are formed, allowing relatively high-boiling polymers to gravitate within the liquid distillate in said body of material toward the bottom thereof, and separately withdrawing from said body of material a stream of said liquid distillate having relatively low polymer content and a stream of the liquid distillate that is relatively high in polymer content.

2. The process of refining petroleum hydrocarbons that includes subjecting heated gasoline-containing cracked petroleum distillate to polymerization by passing the liquid distillate into and upwardly within a body of adsorptive material wherein polymers are formed, allowing relatively high-boiling polymers to gravitate within the liquid distillate in said body of material toward the bottom thereof, withdrawing from the top of said material a stream of said liquid distillate having relatively low polymer content, and withdrawing from the bottom of said material a separate stream of the liquid distillate that is relatively high in polymer content.

3. The process of refining petroleum hydrocarbons that includes subjecting heated gasoline-containing cracked petroleum distillate to polymerization by passing the liquid distillate into an intermediate depth in a body of adsorptive material wherein polymers are formed, allowing relatively high-boiling polymers to gravitate within the liquid distillate in said body of material toward the bottom thereof, and separately withdrawing from said body of material a stream of said liquid distillate having relatively low polymer content and a stream of the liquid distillate that is relatively high in polymer content.

4. The process of refining petroleum hydrocarbons that includes subjecting heated gasoline-containing cracked petroleum distillate to polymerization by passing the liquid distillate into a body of adsorptive material wherein polymers are formed, allowing relatively high-boiling polymers to gravitate within the liquid distillate in said body of material toward the bottom thereof, separately withdrawing from said body of material a stream of said liquid distillate having relatively low polymer content and a stream of the liquid distillate that is relatively high in polymer content, subjecting the last mentioned stream of distillate to cracking, and returning the resulting cracked hydrocarbons to said body of adsorptive material in liquid phase.

5. The process of refining petroleum hydrocarbons that includes subjecting heated gasoline-containing cracked petroleum distillate to polymerization by passing the liquid distillate into a body of adsorptive material wherein polymers are formed, allowing relatively high-boiling polymers to gravitate within the liquid distillate in said body of material toward the bottom thereof, separately withdrawing from said body of material a stream of said liquid distillate having relatively low polymer content and a stream of the liquid distillate that is relatively high in polymer content, mixing said relatively low polymer content stream with heated heavier oil having a substantially higher boiling range than said gasoline, vaporizing said gasoline from the heavier oil to leave impurities of the distillate in an unvaporized residual oil, subjecting said residual oil and said relatively high polymer content stream of distillate to cracking, and returning the resulting cracked hydrocarbons to said body of adsorptive material in liquid phase.

6. The process of refining petroleum hydrocarbons that includes subjecting heated gasoline-containing cracked petroleum distillate to polymerization by passing the liquid distillate into a body of adsorptive material wherein polymers are formed, allowing relatively high-boiling polymers to gravitate within the liquid distillate in said body of material toward the bottom thereof, separately withdrawing from said body of material a stream of said liquid distillate having relatively low polymer content and a stream of the liquid distillate that is relatively high in polymer content, mixing said relatively low polymer content stream with heated heavier oil having a substantially higher boiling range than said gasoline, vaporizing said gasoline from the heavier oil to leave impurities of the distillate in an unvaporized residual oil, combining said residual oil and said relatively high polymer content stream of distillate, subjecting the combined oils to cracking, and returning the resulting cracked hydrocarbons to said body of adsorptive material in liquid phase.

7. The process of refining petroleum hydrocarbons that includes subjecting heated gasoline containing cracked petroleum distillate to polymerization by passing the liquid distillate into and upwardly within a body of adsorptive material wherein polymers are formed, allowing relatively high-boiling polymers to gravitate within the liquid distillate within said body of material toward the bottom thereof, withdrawing from the top of said material a stream of said liquid distillate having relatively low polymer content, mixing said relatively low polymer content stream with heated heavier oil having a substantially higher boiling range than said gasoline, vaporizing said gasoline from the heavier oil to leave impurities of the distillate in an unvaporized residual oil, subjecting said residual and said relatively high polymer content stream of distillate to cracking, and returning a gasoline-containing liquid fraction of the resulting cracked hydrocarbons to said body of adsorptive material.

8. The process of refining petroleum hydrocarbons that includes subjecting heated gasoline-containing cracked petroleum distillate to polymerization by contacting the liquid distillate with adsorptive material, separating from said material a stream of the liquid distillate having relatively low polymer content, separating from the material another stream of the liquid distillate that is relatively high in polymer content, subjecting the last mentioned stream of distillate to cracking and subjecting a liquid gasoline containing fraction of the resulting cracked hydrocarbons to polymerization by said adsorptive material together with said distillate.

9. The process of refining petroleum hydrocarbons that includes subjecting heated gasoline-containing cracked petroleum distillate to polymerization by contacting the liquid distillate with adsorptive material, separating from said material a stream of the distillate having relatively low polymer content, separating from the material another stream of the distillate that is relatively high in polymer content, mixing said relatively low polymer content stream with heated heavier oil having a substantially higher boiling range than said gasoline, vaporizing said gasoline from the heavier oil to leave impurities of the distillate in an unvaporized residual oil, subjecting said residual oil and said relatively high polymer content stream of distillate to cracking, and contacting a gasoline containing fraction of the resulting cracked products with said adsorptive material.

10. The process of refining petroleum hydrocarbons that includes subjecting petroleum to cracking, polymerizing gasoline-containing heated distillate produced thereby by passing the liquid distillate into a body of adsorptive material wherein polymers are formed, allowing relatively high-boiling polymers to gravitate within the liquid distillate in said body of material toward the bottom thereof, separately withdrawing from said body of material a stream of said liquid distillate having relatively low polymer content and a stream of the liquid distillate that is relatively high in polymer content, subjecting the last mentioned distillate to cracking and returning a gasoline-containing liquid fraction of the resulting cracked hydrocarbons to said body of adsorptive material.

11. The process of refining petroleum oil that includes, subjecting the oil to cracking in a cracking zone, subjecting the hydrocarbons from said cracking zone to fractionation to produce relatively heavy residuum, gasoline-containing pressure distillate, and uncondensed gases, passing the liquid distillate into a body of adsorptive material wherein polymers are formed, allowing relatively high-boiling polymers to gravitate within the liquid distillate in said body of material toward the bottom thereof, separately withdrawing from said body of material a stream of said distillate having relatively low polymer content and a stream of the distillate that is relatively high in poylmer content, passing through a heating zone a stream of solvent oil having a boiling range substantially higher than that of the gasoline content of the pressure distillate, mixing the heated solvent oil with said relatively low polymer content stream of the polymerized pressure distillate, vaporizing and separating the gasoline from the unvaporized solvent oil in a vaporizing zone, thereby leaving gum-forming and sulphur-containing impurities of the distillate in said solvent oil, and passing said solvent oil from the vaporizing zone to said cracking zone as preheated charging stock.

12. The process of refining petroleum oil that includes, subjecting the oil to cracking in a cracking zone, subjecting the hydrocarbons from said cracking zone to fractionation to produce relatively heavy residuum, gasoline-containing pressure distillate, and uncondensed gases, passing the liquid distillate into a body of adsorptive material wherein polymers are formed, allowing relatively high-boiling polymers to gravitate within the liquid distillate in said body of material toward the bottom thereof, separately withdrawing from said body of material a stream of said distillate having relatively low polymer content and a stream of the distillate that is relatively high in polymer content, recirculating said relatively high polymer content stream of the distillate to said cracking zone, passing through a heating zone a stream of solvent oil having a boiling range substantially higher than that of the gasoline content of the pressure distillate, mixing the heated solvent oil with said relatively low polymer content stream of the polymerized pressure distillate, vaporizing and separating the gasoline from the unvaporized solvent oil in a vaporizing zone, thereby leaving gum-forming and sulphur-containing impurities of the distillate in said solvent oil, and passing said solvent oil from the vaporizing zone to said cracking zone as preheated charging stock.

WILLIAM T. HANCOCK.